United States Patent [19]

Harrison et al.

[11] 4,322,485
[45] Mar. 30, 1982

[54] PREPARATION OF MATERIALS

[75] Inventors: Keith T. Harrison, Wantage; Peter McGeehin, Newbury; Alan Hooper, Abingdon, all of England

[73] Assignee: United Kingdom Atomic Energy Authority, London, England

[21] Appl. No.: 156,584

[22] Filed: Jun. 5, 1980

[30] Foreign Application Priority Data

Jun. 13, 1979 [GB] United Kingdom ............... 20506/79

[51] Int. Cl.³ .......................... H01M 6/18; H01G 9/02
[52] U.S. Cl. .................................... 429/193; 252/62.2
[58] Field of Search ................ 429/191, 190, 193, 30, 429/33; 423/306, 336; 252/62.2; 106/57, 299, 69, 55; 204/195 S

[56] References Cited

U.S. PATENT DOCUMENTS

| | | | |
|---|---|---|---|
| 4,042,482 | 8/1977 | Shannon | 429/191 X |
| 4,190,500 | 2/1980 | Booth | 429/193 X |
| 4,206,016 | 6/1980 | Booth | 429/193 X |
| 4,237,200 | 12/1980 | Weddigen | 429/191 X |
| 4,237,201 | 12/1980 | Rouxel | 429/191 X |

FOREIGN PATENT DOCUMENTS 1181794 2/1970 United Kingdom .
2011366 7/1979 United Kingdom .

*Primary Examiner*—Anthony Skapars
*Attorney, Agent, or Firm*—Larson and Taylor

[57] ABSTRACT

The present invention relates to the preparation of materials and finds one application in the preparation of ion conductors and precursors therefor.

There is disclosed a process for use in the preparation of a material of the general formula $$Na_{1+x}Zr_2Si_xP_{3-x}O_{12}$$

which includes the step of preparing a precursor for the material by forming a precipitate containing zirconia (or a precursor therefor) and at least some of the other elements appropriate to the material.

For materials with the highest conductivities for applications as solid electrolytes with low resistance x preferably takes a value in the range: $1.8 \leq x \leq 2.2$.

22 Claims, 1 Drawing Figure

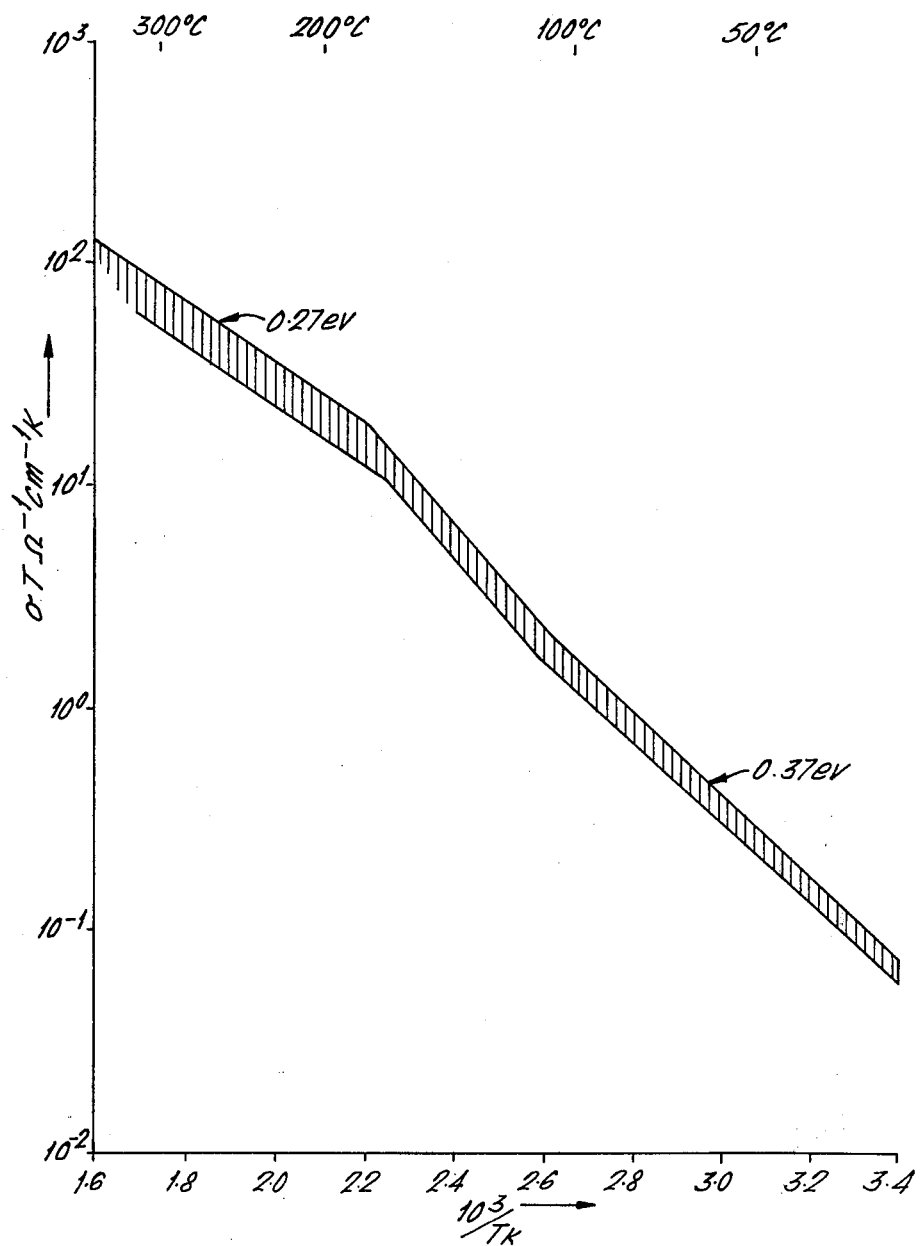

PREPARATION OF MATERIALS

The present invention relates to the preparation of materials and finds one application in the preparation of materials which are ion conductors and precursors therefor.

According to one aspect of the present invention there is provided a process for use in the preparation of a material of the general formula $$Na_{1+x}ZR_2Si_xP_{3-x}O_{12}$$

which includes the step of preparing a precursor for the material by forming a precipitate containing zirconia (or a precursor therefor) and at least some of the other elements appropriate to the material.

Materials falling within the foregoing general formula have been found to be useful ion conductors.

The value of x may be as follows: $0 \leq x \leq 3$. However, to obtain a material with best conductivities for application as solid electrolytes with low resistance we prefer that x takes a value in the range: $1.8 \leq x \leq 2.4$.

We prefer that the process includes the step of precipitating zirconia (or a precursor therefor) from solution, or colloidal dispersion, in the presence of at least some of the other elements appropriate to the material thereby to produce a precursor for the material.

The precursor for zirconia can, in one embodiment, be a hydrated form of zirconia such as a zirconia sol which can be prepared in accordance with B.P. 1,181,794 (UKAEA).

Preferably the zirconia (or precursor therefor) is precipitated in the presence of all the other elements appropriate to the material with the proviso that the oxygen content of the precursor for the material may be varied during subsequent processing.

It will be appreciated that the "other elements appropriate to the material" are sodium, silicon and phosphorous, and optionally further oxygen (if that associated with the zirconium in the zirconia, or precursor therefor, is insufficient for the formation of the material during further processing) and precursors therefor.

It will be also appreciated that in general the elements will not be present as free elements as such, but will either be in ionic form or in combined form (e.g. as compounds). In some circumstances it may be possible, for example, for ions of one element to be associated with colloidal particles of a compound of another element (e.g. zirconium ions may be sorbed onto the surface of silica particles in a colloidal dispersion containing zirconium ions and colloidal silica particles).

The term "colloidal dispersion" as used herein embraces colloidal solutions.

Generally the precursor for the material as precipitated can be initially a gelatinous precipitate, but on ageing at an elevated temperature (e.g. 60° to 80° C. for ~2 hours) the precursor can become a more crystalline slurry.

The zirconia (or precursor therefor) may be precipitated from a solution of a zirconium salt (e.g. zirconyl nitrate in nitric acid) or may be precipitated from a zirconia sol (e.g. as prepared in accordance with UKAEA British Pat. No. 1,181,794). Also it is possible, for example, for some of the other elements appropriate to the material to be precipitated from solution or colloidal solution. For example, a colloidal solution containing zirconium and silicon species can be used to precipitate $ZrO_2$ and $SiO_2$ together.

Such a colloidal solution containing zirconium and silicon species may be prepared in accordance with British Patent Application No. 45469/77 (UKAEA), now British Patent Application No. 2011366A, the Specification relating to which discloses inter alia:

"A process for the precipitation of a colloidal dispersion suitable for use in the preparation of a material containing zirconium, silicon and oxygen, which comprises bringing together colloidal silica and colloidal zirconia, or colloidal silica and a solution of a precursor for zirconia." and "The colloidal dispersion may be formed, for example, by mixing together an aqueous silica sol and an aqueous zirconia sol."

In one embodiment of the present invention finely divided silica is added with stirring to an aqueous alkaline precipitating solution containing phosphorous and sodium species to form a suspension and subsequently to this suspension is added an aqueous zirconia sol to produce a gelatinous precipitate.

The addition of the aqueous zirconia sol is preferably done with vigorous stirring.

The alkaline precipitating solution can conveniently comprise an aqueous solution of $NH_4H_2PO_4$ and $Na_2CO_3$.

Preferably free $CO_2$ is expelled from the precipitating solution before use by heating to $>60°$ C. (eg 60°–75° C.).

In another embodiment of the present invention an aqueous solution of a zirconyl salt, or a colloidal solution of zirconia, is mixed with an aqueous suspension of silica to form a mixture, and subsequently the mixture is mixed with an alkaline precipitating solution containing phosphorous and sodium species to produce a gelatinous precipitate.

The alkaline precipitating solution can conveniently comprise an aqueous solution of $NH_4H_2PO_4$ and $Na_2CO_3$. As hereinbefore mentioned, preferably free $CO_2$ is expelled from the precipitating solution before use by heating to $>60°$ C. (eg 60°–75° C.).

An aqueous suspension of silica for use in accordance with the present invention can be prepared, for example, by high speed mixing of a suitable silica powder with water. (A suitable silica powder is that commercially available as acid-washed precipitated silica (commercial grade) marketed by Hopkins and Williams Ltd.).

A colloidal solution of silica for use in accordance with the present invention can be prepared by dispersing fine particles of silica in water. The fine particles can be, for example, those produced by a vapour phase condensation method.

Such vapour phase condensation methods can give a substance in a fine, small particle size, high surface area form suitable for dispersion in a liquid to form a colloidal solution.

A vapour phase condensation method is one which involves a vapour phase intermediate. Examples of vapour phase condensation methods are hydrolysis of volatile halides or alkoxides (e.g. flame hydrolysis of volatile metal halides), evaporation and condensation methods using electron beam, DC arc or RF plasma heating, and oxidation to give a smoke which is then condensed.

A specific example of such a method is the flame hydrolysis of a halide to give a corresponding refractory oxide where substantially spherical particles are formed. Such refractory oxides are in a fine, small particle size, high surface area form and may, for example, have a particle size in the range 4-50 nm diameter.

British Patent Application No. 43463/75 (UKAEA) discloses, inter alia, the formation of a colloidal solution (sol) of silica by dispersion of a commercially available flame hydrolysed silica powder in water.

In a further embodiment of the present invention a colloidal solution containing zirconium and silicon species is mixed with an alkaline precipitating solution containing phosphorous and sodium species to produce a gelatinous precipitate.

The alkaline precipitating solution can conveniently comprise an aqueous solution of $NH_4H_2PO_4$ and $Na_2CO_3$. As hereinbefore mentioned, preferably free $CO_2$ is expelled from the precipitating solution before use by heating to $>60°$ C. (eg $60°-75°$ C.).

It will be appreciated that the use of a colloidal solution containing zirconium and silicon species (e.g. as disclosed in UKAEA British Patent Application No. 45469/77 (2011366A) as hereinbefore mentioned) avoids the necessity of using a suspension of silicon species (e.g. a suspension of silica).

To produce a material of the general formula $Na_{1+x}Zr_2Si_xP_{3-x}O_{12}$ in a ceramic form suitable for use, for example, as an ion conductor (e.g. as electrolytes in electrochemical systems such as batteries and monitoring devices), a precursor, containing zirconia and other elements appropriate to the material prepared as hereinbefore disclosed is further treated.

Thus for example:

(i) a gelatinous precipitate precursor can be aged (as hereinbefore disclosed) to give a more crystalline slurry, (ii) the slurry heated to dryness to give a solid product, (iii) the solid product calcined to remove water (and oxides of nitrogen if appropriate) and cause a chemical reaction to give a calcined product which is substantially free of unreacted $ZrO_2$, (iv) the calcined product powdered to give a calcined powder, (v) the calcined powder compacted (e.g. by a steel die) to give a "green" compact, and (vi) the green compact fired to give a ceramic material.

The solid product produced as in step (ii) may be, for example, a friable cake which is powdered prior to step (iii).

We prefer that the calcination step (iii) above is effected at the lowest temperature consistent with (a) achieving substantially complete loss of water (and nitrogen oxides (e.g. $NO_2$) if appropriate) and (b) effecting the chemical reaction to produce a calcined product substantially free of unreacted $ZrO_2$. A temperature of $\sim 850°$ C. has been found to be suitable.

The production of calcined powder (step (iv)) is preferably carried out by crushing the calcined product of step (iii), sieving the crushed product and ball milling it. The crushing of the calcined product of step (iii) may be conveniently carried out, for example, in a mechanical mortar, having "high alumina" (high abrasion resistance) pestle and bowl (e.g. Glen Creston Type RMD). The crushing is preferably carried out for the minimum time consistent with desired comminution for the further steps.

The high abrasion resistance pestle and bowl is used to minimise the likelihood of contamination with aluminium. It is for this reason also that the crushing time is kept to a minimum.

As an alternative to avoid possible aluminium contamination, a natural agate pestle and mortar may be used. We prefer the ball milling is carried out using zircon balls in a polythene container so as to reduce the risk of contaminating the calcined powder with unwanted elements (e.g. aluminium contamination could occur if alumina balls were used in the ball milling).

We have found that the compaction step (v) can conveniently be carried out by cold-compaction in a conventional steel die at a pressure of $\sim 150$ MPa to give compacts of 60% Theoretical Density (TD). Also, we have found that this density can be increased to 70-75% TD by subsequent hydrostatic pressing at 1000 MPa, or by use of "Carbowax" (Registered Trade Mark) as a die lubricant. However, we have found that this increase in the density of the green compact does not result in a significant increase in the final density of the ceramic material produced by firing (step (vi)).

Previously reported attempts by other workers to produce a material (for use as a fast ion conductor) of the formula $Na_3Zr_2Si_2PO_{12}$ (i.e. $Na_{1+x}Zr_2Si_xP_{3-x}O_{12}$ where $x=2$) by conventional pressureless sintering techniques have resulted in a product of somewhat low density (maximum 94% TD) containing free zirconia. In accordance with the present invention we have prepared ceramic materials (suitable for use as an ion conductor) of the general formula $Na_{1+x}Zr_2Si_xP_{3-x}O_{12}$ (e.g. where $x=2$) which are substantially free of unreacted zirconia and of significantly higher density (95-98% TD) than that obtained by previous workers. The electrical conductivity of the ceramic materials of 95-98% TD prepared in accordance with the present invention, is in the range of $0.1-0.2$ $\Omega^{-1}cm^{-1}$ at $300°$ C.

It is believed that step (iii) is particularly important in obtaining a material substantially free of unreacted zirconia.

To achieve the density of 95-98% we have found that it is very desirable that the firing step (vi) is a pressureless sintering step carried out in the presence of a protective powder. Thus the firing can be carried out at a substantially atmospheric pressure in the presence of a powder of substantially the same composition as the green compact to inhibit partial volatilization therefrom by providing an "equilibrium atmosphere" about the compact. As an alternative, the protective powder may contain a 5-10 m/o excess of $P_2O_5$, to enhance the partial pressure thereof in the atmosphere surrounding the compact.

The temperature of the firing step is preferably between $1225°$ and $1250°$ C. The time at this temperature is preferably between 2 and $2\frac{1}{2}$ hours.

According to another aspect of the present invention there is provided a process for the preparation of a shaped ceramic body of a material having the general formula:

$$Na_{1+x}Zr_2Si_xP_{3-x}O_{12}$$

which comprises heating a precursor for the material containing zirconia and other elements appropriate to the material to give a solid product, calcining the solid product to remove water (and oxides of nitrogen if appropriate) and cause a chemical reaction to give a calcined product substantially free of unreacted zirconia, powdering the calcined product to give a calcined powder, compacting the calcined powder to give a shaped green body and firing the shaped green body to give a shaped ceramic body.

Examples of shaped ceramic bodies which may be prepared in accordance with the present invention are closed-ended tubes.

Cation-exchanged analogues of $Na_{1+x}Zr_2Si_xP_{3-x}O_{12}$ (and shaped ceramic bodies thereof) can be prepared (e.g. lithium and hydrogen analogues).

The invention also provides a material of the general formula:

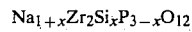
$Na_{1+x}Zr_2Si_xP_{3-x}O_{12}$ whenever prepared by a process in accordance with the invention.

The invention will now be further described, by way of example only, with reference to the single FIGURE of the accompanying drawing, which is a plot of the conductance against temperature for pellets of material prepared in accordance with the present invention, and by reference to the following Example:

EXAMPLE 1.5 moles of $NH_4H_2PO_4$ were dissolved in 2.0 liters of distilled water, heated to 60°–75° C. and subsequently 2.25 moles of $Na_2CO_3$ were added (in small amounts to allow for effervescence) and dissolved. (Both the $NH_4H_2PO_4$ and the $Na_2CO_3$ were Analar grade) ('Analar' is a Registered Trade Mark of Analar Standards Ltd.). Carbon dioxide was expelled from the resulting solution by heating at 60° C.–75° C.

3 moles of finely divided silica ("Acid-washed, precipitated silica, pure", Hopkins & Williams Ltd.) were added in small amounts with vigorous stirring to maintain a colloidal suspension.

Concurrently 0.79 liters of a zirconia sol (prepared in accordance with B.P. 1181794 (UKAEA) containing 468 g/l $ZrO_2$ (equivalent to 3 moles $ZrO_2$) was diluted to 2 liters with distilled water and heated slowly to 60°–75° C.

The diluted zirconia sol was slowly added to the previously prepared colloidal suspension containing silica with vigorous stirring at even temperature to form a gelatinous precipitation due to the alkalinity of the $NH_4H_2PO_4$ and $Na_2CO_3$ solution.

Stirring was continued to prevent settling of the precipitate until the reagents had been thoroughly mixed.

The suspension was then allowed to settle to give a precipitate (comprising the intimately mixed hydroxides or hydrated oxides of silicon and zirconium together with some of the sodium and phosphate ions as adsorbed species) and allowed to age at ~60° C. for 2 hours until a crystalline slurry was obtained.

The crystalline slurry was evaporated to dryness without removal of any supernatant liquor in air using a hot plate, the resulting solid product, which was a friable cake, was crushed to give a powder using a "high alumina" pestle and bowl, and heated to 850° C. for approximately 30 minutes to remove water and $NO_2$ and give complete chemical reaction to produce a product substantially free of unreacted zirconia (as confirmed by x-ray analysis).

The cake thus obtained was crushed in a "high alumina" mechanical pestle and mortar for the minimum of time consistent with obtaining the desired comminution, passed through a 53 μm sieve, and subsequently ball-milled for 16 hours using zircon balls in a polythene container.

The resulting powder was cold compacted in a conventional steel die at a pressure of 150 MPa to give a green compact of ~60% TD.

The green compact was supported on a disc of platinum foil at the bottom of a first alumina crucible and covered by a second (smaller) inverted alumina crucible placed inside the first crucible.

The annular space between the smaller inverted alumina crucible and the inner wall of the first alumina crucible was packed with compressed powder of substantially the same chemical composition as the green compact and the first crucible then covered by an alumina lid. The whole was then placed in a furnace having a uniform temperature, and fired in air for 2 hours at a carefully controlled temperature between 1220° and 1225° C. The rate of heating up to this temperature was controlled so as not to exceed 500 deg. C./hour.

After removal from the crucible the fired compact was found to be a sintered ceramic material with a density of 97.6% TD. (TD is 3.27 gcm$^{-3}$).

The ionic conductivities of pellets of ceramic material prepared in accordance with the present invention have been measured in dry air at ~0.2 torr. To do this a number of electrode types have respectively been applied to flat faces of the pellets in different experiments. Thus evaporated gold, sputtered platinum and graphite electrodes have respectively been applied by known techniques.

AC measurements from 500 Hz to 1 MHz were carried out in the temperature range 25° C.–350° C. and the data analysed using complex-plane techniques.

The resistivity at 300° C. is in the range 5–10 Ωcm with an activation energy above 200° C. of 0.27 eV. Below 150° C., the activation energy is 0.37 eV with a resistivity at 25° C. of ~$3.10^3$ Ωcm.

The single FIGURE of the accompany drawing is a semilogarithmic plot of the conductivity multiplied by temperature against reciprocal temperature for pellets of material prepared in accordance with the present invention.

We claim:

1. A process for use in the preparation of a material of the general formula:

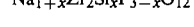
$Na_{1+x}Zr_2Si_xP_{3-x}O_{12}$ wherein the value of x is defined by $0 \leq x \leq 3.0$, which process includes the step of forming a precursor for the material by precipitating zirconia, or a precursor therefor, from solution or colloidal dispersion, in the presence of elements selected from the group consisting of sodium, silicon, phosphorous and oxygen.

2. A process as claimed in claim 1 wherein the zirconia, or precursor therefor, is precipitated in the presence of the elements sodium, silicon, phosphorous and oxygen.

3. A process as claimed in claim 1 wherein the zirconia, or precursor therefor, is precipitated from a solution of a zirconium salt.

4. A process as claimed in claim 1 wherein the zirconia, or precursor therefor, is precipitated from a zirconia sol.

5. A process as claimed in claim 1 wherein $ZrO_2$ and $SiO_2$ are precipitated together from a colloidal solution containing zirconium and silicon species.

6. A process as claimed in claim 1 wherein finely divided silica is added with stirring to an aqueous alkaline precipitating solution containing phosphorous and sodium species to form a suspension and subsequently to this suspension is added an aqueous zirconia sol to produce a geltinous precipitate.

7. A process as claimed in claim 1 wherein an aqueous solution of a zirconyl salt, or a colloidal solution of zirconia, is mixed with an aqueous suspension of silica to form a mixture, and subsequently the mixture is mixed with an alkaline precipitating solution containing phosphorous and sodium species to produce a gelatinous precipitate.

8. A process as claimed in claim 1 wherein colloidal a solution containing zirconium and silicon species is mixed with an alkaline precipitating solution containing phosphorous and sodium species to produce a gelatinous precipitate.

9. A process as claimed in claim 1 wherein an alkaline precipitating solution is used and said alkaline precipitating solution comprises an aqueous solution of $NH_4H_2PO_4$ and $Na_2CO_3$.

10. A process as claimed in claim 1 wherein a colloidal solution of silica is used and the colloidal solution of silica is prepared by dispersing fine particles of silica in water.

11. A process as claimed in claim 10 wherein the fine particles of silica are those produced by a vapour phase condensation method.

12. A process as claimed in claim 1 for use in the preparation of a material of the general formula:

$$Na_{1+x}Zr_2Si_xP_{3-x}O_{12}$$

which includes preparing a gelatinous precipitate containing zirconia and elements selected from the group consisting of sodium, silicon, phosphorous and oxygen and aging the gelatinous precipitate at an elevated temperature to give a crystalline slurry.

13. A process as claimed in claim 12 including the further step of heating the slurry to dryness to give a solid product.

14. A process as claimed in claim 13 including the further step of calcining the solid product to remove water and cause a chemical reaction to give a calcined product which is substantially free of unreacted $ZrO_2$.

15. A process as claimed in claim 14 including the further step of powdering the calcined product to give a calcined powder.

16. A process as claimed in claim 15 including the further step of compacting the calcined powder to give a green compact.

17. A process as claimed in claim 16 including the further step of firing the green compact to give a ceramic material.

18. A process as claimed in claim 17 wherein the firing step is a pressureless sintering step carried out in the presence of a protective powder.

19. A process as claimed in claim 18 wherein the firing step is carried out at substantially atmospheric pressure in the presence of a powder of substantially the same composition as the green compact to inhibit partial volatilisation therefrom.

20. A process as claimed in claim 19 wherein the protective powder contains 5 to 10 m/o excess of $P_2O_5$.

21. A process as claimed in claim 1 and for the preparation of a shaped ceramic body of a material having the general formula:

$$Na_{1+x}Zr_2Si_xP_{3-x}O_{12}$$

which comprises heating a precursor for the material containing zirconia and elements selected from the group consisting of sodium, silicon, phosphorous and oxygen, to give a solid product, calcining the solid product to remove water, and oxides of nitrogen if appropriate, and cause a chemical reaction to give a calcined product substantially free of unreacted zirconia, powdering the calcined product to give a calcined powder, compacting the calcined powder to give a shaped green body and firing the shaped green body to give a shaped ceramic body.

22. A process as claimed in claim 1 wherein the proportions of the elements are selected such that x takes a value in the range $1.8 \leq x \leq 2.4$.

* * * * *